(No Model.)  5 Sheets—Sheet 1.

E. B. MEATYARD.
STEAM HAMMER.

No. 290,449. Patented Dec. 18, 1883.

Witnesses

Inventor
Edward B. Meatyard
By Coburn & Thacher
Attorneys

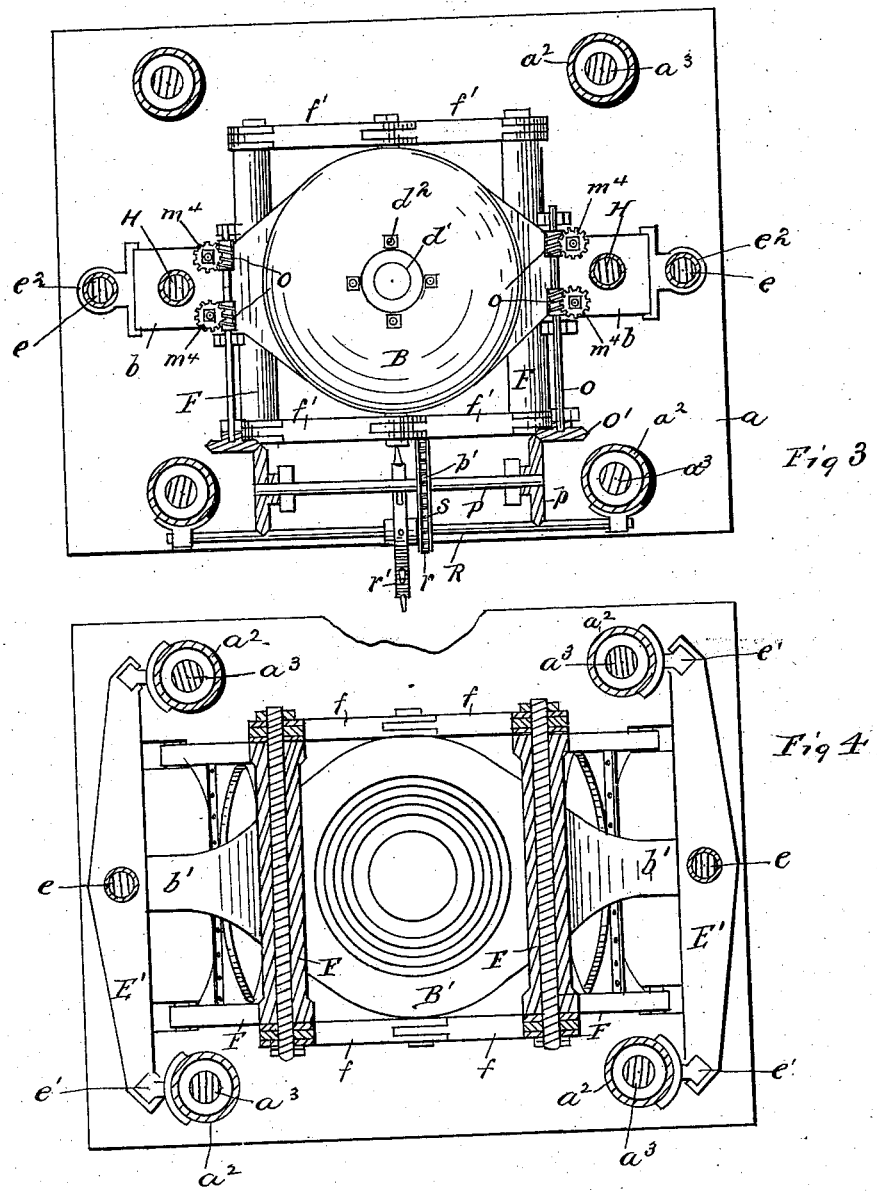

(No Model.)
E. B. MEATYARD.
STEAM HAMMER.
No. 290,449. Patented Dec. 18, 1883.
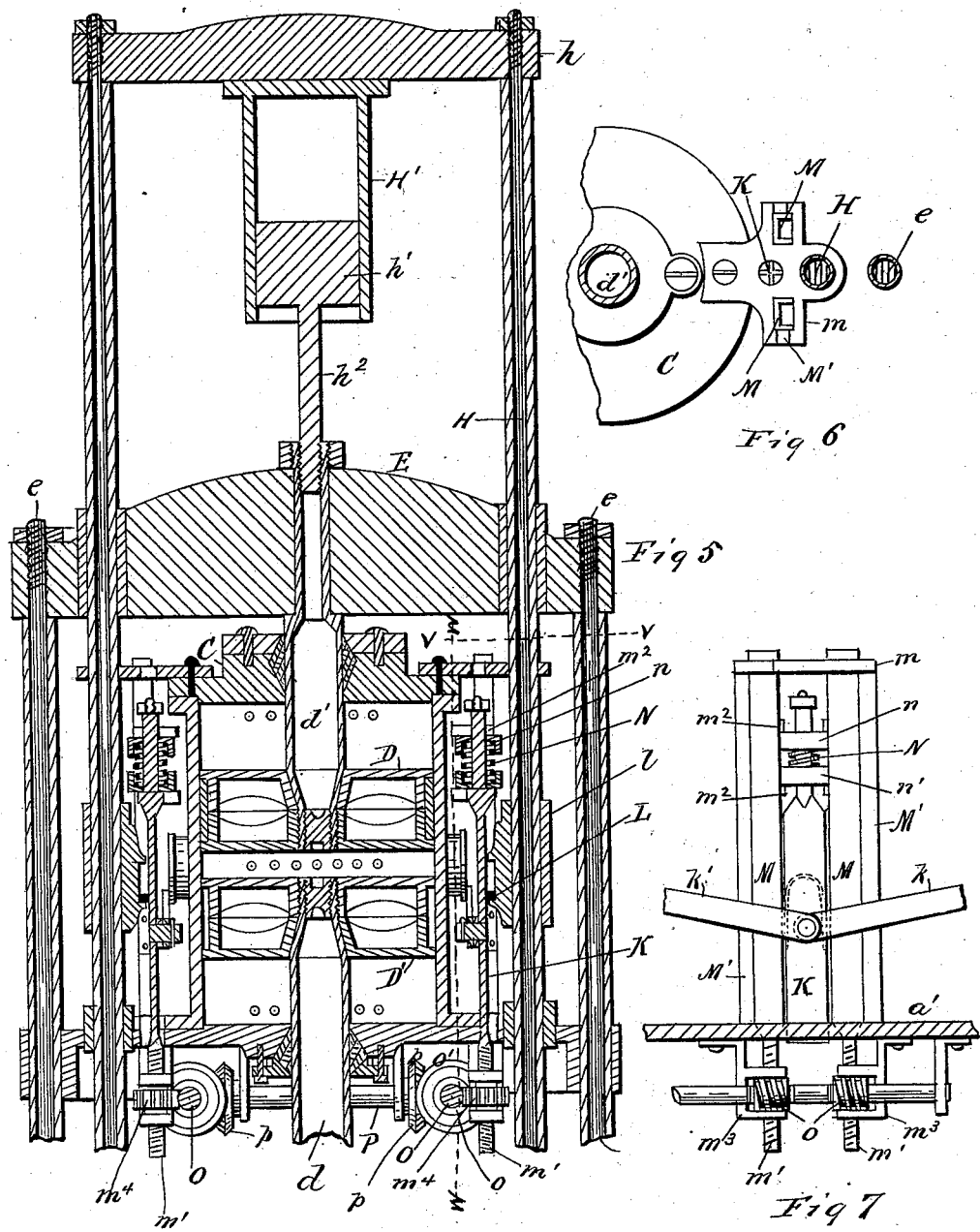
Witnesses
W. C. Coulies
John R. Gall
Inventor
Edward B. Meatyard
By Thacher
Attorneys

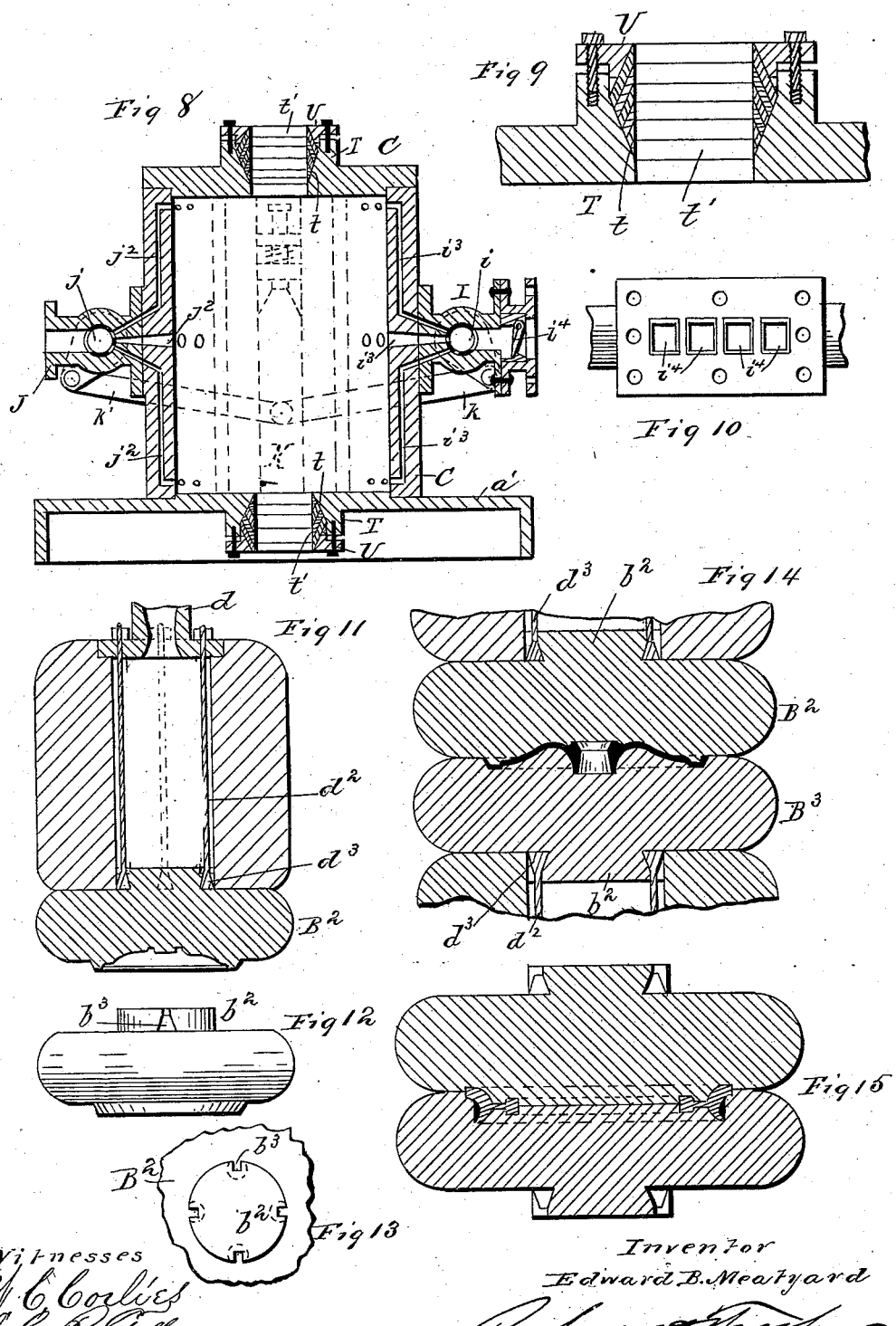

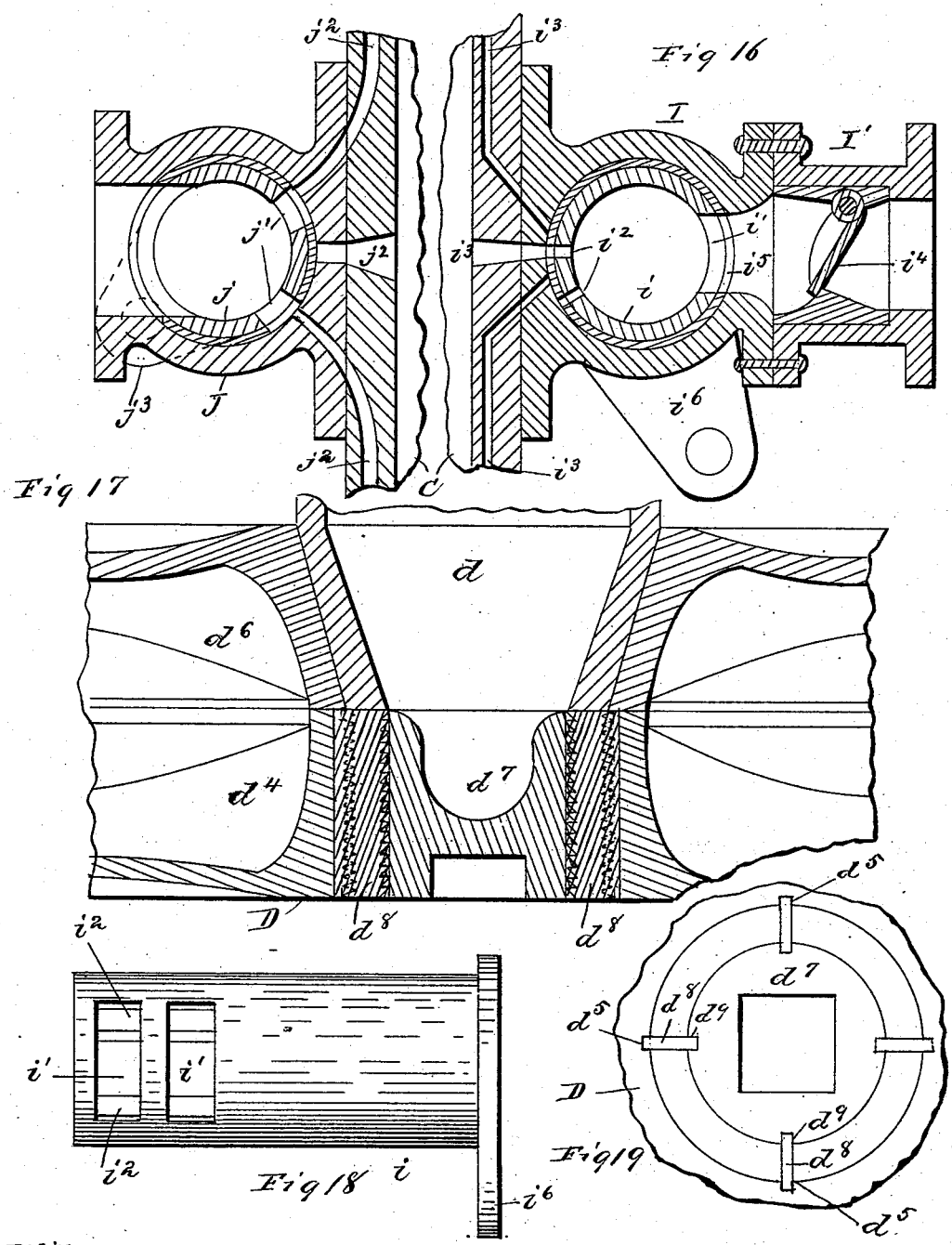

UNITED STATES PATENT OFFICE.

EDWARD B. MEATYARD, OF LAKE GENEVA, WISCONSIN.

STEAM-HAMMER.

SPECIFICATION forming part of Letters Patent No. 290,449, dated December 18, 1883.

Application filed June 18, 1883. (No model.)

*To all whom it may concern:*

Be it known that I, EDWARD B. MEATYARD, a citizen of the United States, residing at Lake Geneva, in the county of Walworth and State of Wisconsin, have invented certain new and useful Improvements in Steam-Hammers, which are fully set forth in the following specification, reference being had to the accompanying drawings, in which—

Figure 1:
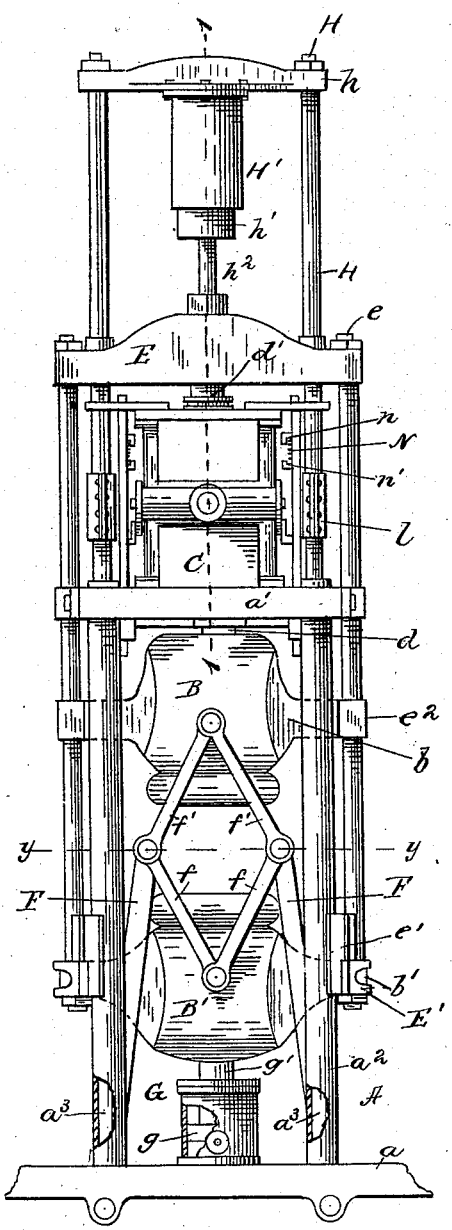
Figure 2:
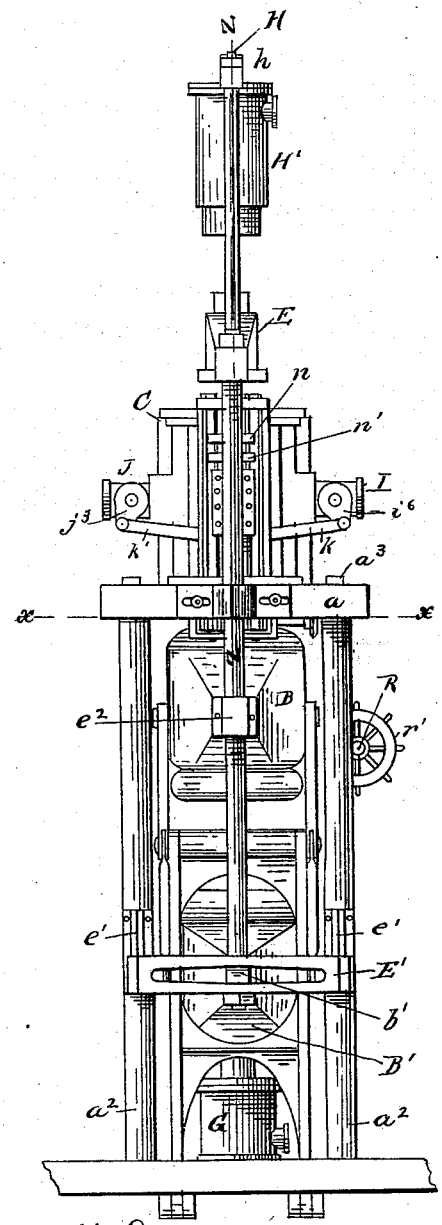

Figure 1 represents a front elevation of a steam-hammer embodying my improvements; Fig. 2, a side elevation of the same; Fig. 3, a plan section of the same on an enlarged scale, taken on the line $xx$, Fig. 2; Fig. 4, a similar view taken on the line $yy$, Fig. 1; Fig. 5, a detail section of the upper part of the hammer on the same scale as Figs. 3 and 4, taken on the line $zz$, Fig. 2; Fig. 6, a detail plan section taken on the line $vv$, Fig. 5; Fig. 7, a detail section taken on the line $ww$, Fig. 5; Fig. 8, a detail section taken on the line 1 1, Fig. 1, on the same enlarged scale; Fig. 9, a detail section of one of the piston stuffing-boxes on a still further enlarged scale; Fig. 10, a detail elevation of the front of the steam-chest on the same scale as in Fig. 8; Fig. 11, a detail section of one of the rams and die attached; Fig. 12, an elevation of the die detached; Fig. 13, a detail plan of the central portion of the die; Fig. 14, a detail section showing the rams brought together and applied to the forming of a car-wheel disk, the scale being enlarged from Fig. 11; Fig. 15, a similar view, showing the application to the construction of a car-wheel; Fig. 16, a detail section showing a central portion of Fig. 8 on a still further enlarged scale; Fig. 17, a vertical section of the center portion of one of the pistons on the same scale as in Fig. 16; Fig. 18, a plan view of the face of the nut which fastens the piston to its rod, and Fig. 19 a side elevation of one of the steam-valves on the same enlarged scale.

My invention relates to certain improvements in steam-hammers for forging purposes, by which certain very valuable results are obtained in the working of the machine-tool, as will be hereinafter stated.

I will proceed to describe in detail the construction and operation of a machine-tool embodying my invention in one way, and will then point out definitely in the claims the special improvements which I believe to be new and wish to protect by Letters Patent.

In the drawings, A represents the main frame of the machine-tool, the main parts of which are a bed-plate, $a$, resting on and securely fastened to any adequate foundation, a cap, $a'$, and strong columns $a^2$, extending from the bed-plate to the cap. These columns are preferably round steel tubes, and strong links or bolts $a^3$, bedded in the foundation, pass up through them and are secured by nuts on the cap. There are two rams—an upper one, B, and a lower one, B'—the bodies of which are cast hollow under pressure, so as to provide for the cooling of the metal, the centering of the dies and piston-stems, and the fastening of the latter through the axis of the rams to the dies, as will be hereinafter explained. The steam-cylinder C is mounted on the cap of the frame, and receives two pistons—an upper one, D, and a lower one, D'. The stem $d$ of the lower piston passes through a stuffing-box in the lower head of the cylinder, and is connected directly to the upper ram, and the stem $d'$ of the upper piston passes up through a stuffing-box in the upper head of the cylinder, and is fastened firmly to a strong cross-head, E, by any suitable means. Strong rods $e$ are connected to the respective ends of the cross-head E, from which they extend downward and are secured at their lower ends to the arms $b'$ of the lower ram. These rods run through suitable guideways at the sides of the frame, and are preferably composed of plain rods extending through the cross-head and arms of the ram, secured by suitable nuts and distance-tubes surrounding said rods between the cross-head and the ram. Transverse guides E' are attached to the ends of the lower ram, being constructed, as shown in the drawings, to move vertically on suitable ways, $e'$, on the upright columns. These guides may be rigidly attached, however, to the columns, and the connecting-rods move vertically in them, this construction and arrangement being in some respects preferable to that shown in the drawings. Guides $e^2$ are also attached to the respective arms $b$ of the upper ram, the connecting-rods $e$ passing through these guides also, whereby the rams are properly centered in connection with their piston attachments, which will presently be explained.

I also provide a balancing mechanism for the rams, which consists of radius-bars F, arranged at each side of the lower ram and pivoted at their lower ends to the bed-plate. Toggle-arms $f$, on each side of the lower ram, are connected, respectively, to the upper ends of the radius-bars and the opposite sides of the lower ram. Similar toggle-arms, $f'$, are connected to the radius-bars in a similar way and to the opposite sides of the upper ram, the arrangement of these parts being such that the radius-bars are substantially vertical when the blow is struck upon the metal. It will be seen from this description that neither ram can move without a corresponding movement of the other in the opposite direction, so that with this balancing mechanism I am enabled to utilize gravity, and not only balance and control the ram, but also through them the pistons of the steam-cylinder, so that neither can "go wild" and burst the cylinder-heads. The lower ram is also provided with an air-cushion, which may be of any suitable construction, to provide both a cushion and a guide for the ram at one and the same time. In the drawings the device referred to for this purpose is a simple air-cylinder, G, mounted on the bed-plate, in which is fitted a piston, $g$, the stem $g'$ of which is connected directly to the lower ram, these parts being arranged so that the axis of this air-piston and its stem will be accurately centered with the axis of the steam-piston stem, whereby the device serves not only as a cushion, but also as a centering and guiding mechanism for the lower ram. I propose to construct this air-cushioning device so that it will also serve the purpose of an air-pump for accumulating and storing air in a suitable reservoir, which may be used as a motor power for any purpose whatever. The rams are connected to the respective stems $g'$ and $d$ in a peculiar manner, which is illustrated in Fig. 11 of the drawings, representing the upper ram and its fastening devices. The piston-stem $d$ is hollow, and at its lower end is provided with a flange extending out all round somewhat larger than the central opening in the ram. This flanged end of the stem is properly seated in the upper end of the ram. The ram is provided with a die, $B^2$, the face of which is shaped to give the required form to the metal which is to be forged, and on the back of which is a circular enlargement, $b^2$, adapted to fit the center opening in the ram, thereby centering the die on the latter. In this enlargement $b^2$ the openings or recesses $b^3$ are cut at the outer edge, which are of any number desired, and preferably dovetail in shape. Strong steel rods $d^2$ connect the die with the piston-stem $d$, these rods being constructed with heads $d^3$, adapted to fit the dovetail in the enlargement at the back of the die, as shown in Fig. 11 of the drawings, from which they extend upward through the central opening of the ram, and are passed through the flange on the lower end of the stem $d$, being drawn to place and held by nuts turned down on the outside of the flange. Obviously, the strain on these rods is very great. I intend, therefore, to have them made in the form desired by forging, rolling, or pressing without upsetting, and the body of the rods should be somewhat smaller than the threaded portion. With this construction I am able to draw up the rods to nearly their limit of elasticity without damaging the threads.

As stated above, the lower ram is connected to the piston-stem of the air-cushion in precisely the same way as just described for the upper ram, this lower ram being provided with a die, $B^3$, the face of which is the obverse of the die $B^2$. In the drawings these dies are shown of a form adapted to forge a car-wheel; but of course it will be understood that any other die-forging may be done with this tool, it being constructed according to the work it is desired to accomplish; but the operation of this tool is limited to such work as can be accurately centered in the dies, and is not adapted to plain forging.

A strut, H, is attached at its lower end to each of the arms of the upper ram. These struts extend upward through the cap to the cross-head, and carry at their upper ends a second cross-head, $h$. Of course they have a vertical movement with the movement of the ram to which they are attached, and they serve to steady the main cross-head, to which the upper piston is connected. An upper air-cushion is also provided by attaching an air-cylinder, H', to the under side of the cross-head $h$, within which is fitted a piston, $h'$, the stem $h^2$ of which extends downward, and is connected in any suitable way to the main cross-head, as shown in Fig. 5 of the drawings. The connection shown in Fig. 5 is made by screwing the lower end of the stem $h^2$ into the upper end of the piston-stem $d'$, which is threaded for this purpose. There is thus provided an air-cushioning device for the upper piston.

The pistons D and D' are each composed of two sections, and are attached to their respective stems in a peculiar way, which will be understood by referring to Fig. 17 of the drawings, in which the construction and attachment of the upper piston is shown.

The violent shocks incident to the impact of the two heavy rams will loosen ordinary nuts, fracture illy-formed parts, and crystallize weak points in the reciprocating parts. I have therefore devised this peculiar way of attaching the pistons to their stems, so as to thoroughly lock the piston-nuts and to obtain adequate strength from the quality of material and special forms, to resist the effect of these shocks and obviate the difficulty mentioned above, which is peculiar to this class of tools. The lower end of the stem $d'$ is threaded for a distance equal to the thickness of the lower section, $d^4$, of the piston, and this section of the stem is also quartered for the same distance by cutting radial slots $d^5$, as shown in Fig. 19 of the drawings. The piston-stem above the threaded section is cone-shaped for a distance equal to the thickness of the upper section, $d^6$, of the piston. This section of the piston has a conical central opening to fit the cone-shaped section of the stem on which it is placed, and the lower section of the piston is threaded and is turned upon the threaded end of the stem. The threaded extremity is also provided with an internal thread and a screw-plug, $d^7$, is turned into this threaded end of the stem, thereby making it steam-tight, and at the same time forcing outward the body of the stem to make it fit closely, and also forcing outward keys $d^8$, which are inserted in the radial slots of the stem and enter seats $d^9$, cut for them in the body of the lower section of the piston. In this way a perfectly-tight joint is made and the piston is prevented from turning.

On the back side of the tool is a steam-chest, I, which is provided with a rotary valve, $i$, and connected to suitable ports with the interior of the steam-cylinder between the pistons, and also with the usual inlets near the heads of the cylinder. The valve $i$ is seated as usual in the chest, but, instead of having the ordinary construction of rotary valves, is made tubular and of the same thickness throughout. Supply-ports $i'$ of this valve are cut transversely, as shown in Fig. 18 of the drawings. The inlet-ports $i^2$ are short and narrow and cut lengthwise, and gridironed, so that sufficient support will be left to preserve the arch or circular form of the valve. The ports $i^2$ are caused to register with the inlet-ports $i^3$ in the seat by the movement of the valve, which will presently be described.

Back of the steam-chest is a box, I', which contains check-valves $i^4$. The valve shown in the drawings is an ordinary check-valve, and requires no special description here, except that it must be arranged close to the steam-chest. Any check-valve suitable for the purpose may be employed, either with or without the box. The tubular valve $i$ is preferably covered with an anti-friction ring, $i^5$, of any suitable material, phosphor-bronze being preferred. The valve is provided with a short crank-arm, $i^6$.

At the front of the tool is an exhaust-chest, J, which is provided with a valve, $j$, similar in construction to the steam-valve just described, being provided with suitable ports, $j'$, registering with the exhaust-ports $j^2$ of the chest under the movements of the valve, which will presently be described. The exhaust-valve is also provided with a crank-arm, $j^3$, similar to the arm of the steam-valve, except that it is shorter, so as to give greater travel to the exhaust-valve, both being worked by the same mechanism, which I will now proceed to describe. The chests and valves are designed to meet any change of temperature, by making them as nearly as possible of uniform thickness all round the cylinder. The excess of heat in the valve over that in its inclosing-chest is met by using metal high in carbon for the valve, and metal low in carbon for its chest.

The working of the valves is effected by means of a slide, K, working in upright guides. A link-rod, $k$, connects this slide with the crank-arm of the steam-valve, and a similar link-rod, $k'$, connects it with the crank-arm of the exhaust-valve, so that the vertical movement of the slide will obviously oscillate both valves. The movement of the slide is effected by the movement of the struts attached to the upper ram. The lower portion of the slide K is of channel form, and to the sides a bow-spring, L, is attached, being arranged on the back of the slide. A collar, $l$, is attached rigidly, but adjustably, to each of the struts, and on its inner face is provided with jaws some little distance apart, between which the bow of the spring L is received. As the struts are moved vertically by the movement of the ram to which they are attached, the slide K will also be moved by the operation of the jaws acting alternately on the spring attached to the slide.

I also provide a variable cut-off by the following means: The guides for the slides K are composed of two sets of bars—movable bars M and stationary bars M', the former being arranged inside of the latter. The upper ends of the movable bars M extend up through a bracket, $m$, attached to the head of the cylinder and to the outer bars, M'. The lower ends of these bars M pass down through the cap, and are provided with a screw-thread, $m'$. The upper ends of the slides K are cylindrical, and are provided with spiral springs N, placed around them and held between plates $n$ and $n'$, also mounted on the cylindrical ends of the slides, both of them being loose and free to move up and down on the bars within certain limits. On the inside of the sliding guide-bars M are pairs of stops or lugs $m^2$, between which the spring-plates move, these lugs being arranged at such a distance apart as to stop the plates when the springs are expanded to the fullest extent. The lower threaded ends of the bars M run through stationary forked guides $m^3$, and in the fork of these guides is a gear-nut, $m^4$, through which the threaded end also passes. A horizontal shaft, O, is mounted on the under side of the cap, and is provided with worm-gears $o$, engaging, respectively, with the gear-nuts $m^4$, and at one end being also provided with a bevel-pinion, $o'$. Of course one of these shafts will be required on each side of the cylinder.

At the back side of the tool is another horizontal shaft, P, also mounted underneath the cap and at right angles to the shafts O. This shaft is provided at each end with a bevel-pinion, $p$, and these pinions engage, respectively, with the bevel-pinions $o'$. Between the pinions $p$ a sprocket-pinion, $p'$, is fixed on the shaft P, and a horizontal shaft, R, is mounted in suitable bearings attached to the columns at the back side of the tool, some distance below the cap. A sprocket-wheel, $r$, is fixed on this shaft, and from it a chain, S, runs over the sprocket-pinion on the shaft P. The shaft R is also provided with a hand-wheel, $r'$, by means of which it is turned in either direction, and obviously turning of the shaft R will rotate the shaft P and the worm-shafts O, and thereby raise or lower the sliding guide-bars M, according as the shafts are turned in one direction or the other.

The mechanism for adjusting the sliding bars may obviously be varied, and I do not limit myself to the construction herein shown and described. In fact, I contemplate using, in place of this arrangement, sprocket-nuts on the slide-bars, a chain run around all four of the nuts, and a suitable driver on a vertical shaft, which, in turn, may be operated by any suitable device—such, for instance, as a hand-wheel shaft, with bevel-gears connecting it to the vertical shaft.

Now, it is obvious that as the valve-slide is moved up and down, as hereinbefore described, it will, in one or the other of these movements, compress the spring between the plates on the upper end thereof, so that as soon as the jaw which is moving the slide in one direction ceases to act the recoil of the spring will cause the slide at once to move in the opposite direction, thereby cutting off steam by the movement of the slide without waiting for the other jaw to take hold of the bow-spring and reverse the motion of the slide. The movement of the slide thus effected by the spring is sufficient to turn the valves enough to cut off steam, but not sufficient to open the ports on the opposite side of the piston. The jaw moving toward the spring now comes in contact with the latter and completes the movement of the slide and the travel of the valves. I place the jaws some distance apart to actuate the valve-slide, for the reason that if there were no slack motion between the strut and the valve-slide the travel of the valve mechanism would be equal to the travel of the hammer, which of course is not desirable. I employ a spring connected to the slide as the device on which the jaws act to move the slide, for the purpose of taking up the shock as the jaws strike in opposite directions. Now, it will be seen that as the movable guide-bars M are adjusted vertically the actuating-springs on the ends of the slides may be caused to operate in one direction or the other. This results from the fact that the retaining-plates are held between keepers on the sliding guide-bars, so that these plates are of course adjusted vertically as the bars are adjusted, and hence may be adjusted to different positions relative to the cylindrical end of the slide which passes up through them, so that either the upward movement of the slide will compress the spring by carrying up the under plate, or the downward movement of the slide will compress the spring by pulling down the upper plate. It will be seen, then, that by changing the position of the sliding bars M, I am enabled to cause the spring on the valve-slide to operate and cut off at any point, either in making the blow or on the recoil; or the adjustment may be such that each spring-plate will be acted on at each end of the movement of the valve-slide, so causing the cut-off to operate on both sides of the pistons. The operation of these devices also produces a compensating effect—that is, what is lost on one side of the pistons is gained on the other—and complete control of the force of the blow is obtained. The first blow on a hot button or ingot of metal should be held well in hand by short steam between the pistons and long steam at the ends of the cylinder. Each successive blow must be harder until the density of the mass is nearly sufficient to cause the recoil of the rams without aid from the steam. This result is obtained by gradually shifting the position of the cut-off mechanism until we obtain short steam at the ends of the cylinder for the recoil, and long steam between the pistons to cushion them to prevent disaster and to supply steam to make the last blow.

I have now described a complete machine-tool embodying my improvements. I wish it understood, however, that I do not confine myself to all the details of construction as herein shown and described, for many modifications may be made in details and many substitutions in the special devices used without departing from the main features of my invention.

With these improvements which I have made, a steam-hammer may be constructed to give a much greater blow with much less weight of material in itself than in hammers of any construction now in use, so far as known to me. This result is due, mainly, to the use of duplex balanced rams, as already explained.

This machine-tool is not designed to and will not take the place of stationary bed-hammers for doing irregular work or for forging long shafting; but as the stationary bed has a low modulus of elasticity and density, and is opposed to a dense and highly elastic ram on the upper side of the mass of metal under treatment, it is obvious that a good portion of the ram's energy in such hammers is transmitted to the soft bed and thence to the surrounding body or bodies in the shape of useless vibration, and also that while the upper side of an unturned forging may be fair, tough, and dense, the under side may be soft, with the cohesion of its particles impaired, if not destroyed; but it must be obvious that with my improvements there will be obtained the benefit of two elastic bodies moving in opposite directions, both for the blow and also for the recoil. The relative value of this arrangement over that in which one elastic body strikes a non-elastic body is well known to engineers, and may be expressed as substantially in the ratio of two to one.

I have had a special object in view in designing this machine-tool—viz., to obtain a hammer for finishing parts of a cast-steel wheel without lathe-work—and it is intended to use the hammer for this purpose after these parts have been subjected to the action of a powerful press—such, for instance, as the ingot-press—for which I have already filed an application for patent. My intention is to use these two tools together, so as to finish the parts all at one heat, the last operation being that of the steam-hammer provided with finishing-dies.

I do not wish to be understood as limiting the application of this invention to the purpose mentioned above, though for such purpose I have found the inherent defects of the stationary bed-hammer to be so great that I cannot rely upon it to suitably form and finish the parts of my steel wheels; but with the duplex balanced hammer herein described and shown I am enabled to finish these wheels or any parts of them accurately, and so that they may be fitted together without lathe-work, which destroys the outer skin—the toughest and hardest portion of the mass. I may further add that for the work intended to be done by this improved hammer the lower ram must be lighter than the upper, for the reason that it carries the mass of metal to be acted upon, and the die on this ram should be the one which best holds the metal. With these limitations the hammer may be adapted to die-forging generally.

In the description above I have only mentioned steam as a motive power for operating this tool; but I do not wish to be understood as limiting myself to steam, for it must be obvious that compressed air or any other compressed gas suitable for use as a motive power may be employed to operate the hammer in the place of steam, the changes required for this purpose being simply mechanical.

It is absolutely necessary in this machine-tool that the pistons should be perfectly centered by means which are durable and as nearly continuous in operation as possible, for it is obvious that the dies must register with exact precision, and only a slight deviation in the centering of the pistons will destroy this register, produce imperfect work, and injure the dies. I am not aware of any stuffing suitable for accomplishing this result with the piston-stems in this machine-tool. I have therefore devised a special improved stuffing-box for the steam-piston stems, adapted to secure the results set forth above, which are necessary to the proper working of this tool. If the wear is upon the gland, the box will soon leak, and the piston will also lose its center.

In Fig. 9 of the drawings I have shown my improved box on an enlarged scale, in which the box T is of any ordinary construction, except that it is provided with a conical groove, $t$, within which are placed concentric conical stuffing-rings $t'$, arranged as shown in the drawings, the lower one being very narrow and gradually increasing in width toward the upper one, which is the widest of all. The gland U is also of ordinary co cept that the aperture is con around the upper part of the Now, it will be seen that as wears away it will gradually the box, and when the narrowe out one of the widest may be other end of the box, to compe wear. The relative position ment of stuffing-boxes and stuff piston-rods are shown in Fig. ings. With this improvement i boxes the stuffing may be appl box much more readily and in a time than with any of the other now known to me, and the stu viously, always closely fit the st properly centered, and at the sa the wear.

Having thus described my in I claim as new, and wish to prot Patent, is—

1. In a steam-hammer, two rams arranged to reciprocate in tical plane, in combination with a cylinder and two steam-pistons work within such cylinder, and spectively, to the respective rams latter are moved positively to a other by the direct action of the the effect of the same steam force, as and for the purposes set forth 2. In a steam-hammer, two movable rams arranged to mov vertical plane, in combination w mechanism connecting the two r whereby any movement of one m panied by a movement of the oth opposite direction, substantially purposes set forth.

3. In a steam-hammer, two movable rams arranged to mov vertical plane, in combination w mechanism connecting the two r whereby any movement of the accompanied by a movement of t in an opposite direction, and two s connected, respectively, to the r positive movement is given to e tially as and for the purposes set 4. The two movable rams B a bination with the steam-cylinde pistons D and D', and the cross nected to the lower ram by the stantially as described.

5. The two movable rams B a bination with the radius-bars F gle-arms $f$ and $f'$, substantially a purposes set forth.

6. The two movable rams B a bination with the radius-bars F $f$ and $f'$, steam-cylinder C, and p D', connected, respectively, to tl stantially as and for the purposes 7. In a steam-hammer, two m in combination with the two pist ely, to the rams, and a cushion-
)ove and below the rams, substan-
for the purposes set forth.
) movable rams B and B', in com-
1 the cylinder C and pistons D
)wer air-cushion, G, connected di-
lower ram, the cross-head E, and
:-cushion, H', substantially as devable rams B and B', in combina-
 steam-cylinder C, pistons D and
ds E and rods e, struts H, and
I', substantially as described.
eam-hammer, a movable ram or
abination with a steam-cylinder
h one or two pistons for actuat-
y the ram or rams, and a differen-
ubstantially as and for the pur-
h.
o movable rams B and B', in com-
h the steam-cylinder C, steam-
d D', within said cylinder, and a
ut-off constructed to act on both
pistons, but in inverse ratio, sub-
and for the purpose described.
eam-hammer, the steam-cylinder
ation with the inlet and exhaust
j, the slide K, and link-rods k and
the valves are worked simulta-
e movement of the slide, substan-
for the purpose set forth.
lves i and j, provided with crank-
³, the slide K, the link-rods k and
ws on the struts H, substantially
e purposes set forth.
lves i and j, in combination with
by which the valves are operated,
N and spring-plates n, on the ends
, and the adjustable guide-plates
provided with lugs $m^2$, between
ring-plates are held, substantially
e purposes set forth.
lves, in combination with the slide
k and k', bow-spring L, attached
he jaws on the struts H, separated
her, so as to permit movement of
ng between the jaws independent
ment of the latter, substantially
e purposes set forth.
alve-actuating slide K, in combi-
the spring L, vertically-moving
d some distance from each other,
ovement of the slide independent
he springs N, spring-plates n, and
ars M, substantially as and for the
 forth.
alve-moving slide K, in combina-
vertical-moving jaws, the springs
lates n, adjustable guide-bars M,
th lugs $m^2$, and mechanism where-
bars may be adjusted at will by attendant to adjust the relative action of th
cut-off, substantially as and for the purposes
set forth.

18. In a steam-hammer, a ram provided with a vertical central opening, in combination with a die attached to the face of the ram by rods running through the central opening and secured to the die and to the end of the piston-stems to which the ram is attached, substantially as and for the purposes set forth.

19. In a steam-hammer, a ram, B or B', in combination with the die $B^2$ or $B^3$, having a head, $b^2$, on its back, in which dovetail recesses $b^3$ are cut, the piston-stem d or g', and the rods $d^2$, provided with conical heads $d^3$, and secured at their inner end to the flange of the piston by screw-nuts, substantially as described.

20. In a steam-hammer for die-forging, the piston composed of two sections, $d^4$ and $d^6$, the latter provided with a cone-shaped central opening, in combination with the piston-stem cone-shaped at a short distance from its extremity, to fit the similar opening in the piston-section, and a threaded extremity at the outer piston-section, substantially as and for the purposes set forth.

21. In a steam-hammer for die-forging, the piston-sections $d^4$ and $d^6$, the latter having a flaring central opening, in combination with a hollow piston-stem, the end of which is provided with a conical seat for the inner section of the piston, and provided with a screw-thread for the outer section of the piston, and a plug, $d^7$, fitting the interior of the end of the stem, substantially as and for the purposes set forth.

22. The piston-section $d^4$, with its central opening threaded and provided with longitudinal grooves $d^8$ for key-seats, in combination with a hollow piston, d, the extremity of which is provided with both an internal and an external screw-thread, and also with radial slots $d^5$, the keys $d^8$, and the screw-plug $d^7$, substantially as described.

23. In a steam-hammer, a movable or reciprocating ram, in combination with a bridle or struts attached thereto and moving therewith, a reciprocating slide arranged to be operated by the movement of the bridle or struts, a steam-cylinder, inlet and exhaust valves, and mechanism connecting the said slide with both the inlet and exhaust valves, whereby the latter are worked simultaneously by the reciprocating movement of the ram, substantially as and for the purposes set forth.

EDWARD B. MEATYARD.

Witnesses:
W. C. CORLIES,
A. M. BEST.